United States Patent Office 3,840,551
Patented Oct. 8, 1974

---

3,840,551
4-SUBSTITUTED-ALKYL-1,3,4-THIADIAZOLON-(5)-YL-(2)-UREA COMPOUNDS
Klaus Sasse, Schildgen, and Ludwig Eue, Cologne, Germany, assignors to Bayer Aktiengesellschaft, Leverkusen, Germany
No Drawing. Filed May 9, 1972, Ser. No. 251,667
Claims priority, application Germany, May 15, 1971,
P 21 24 260.4
Int. Cl. C07d 91/62
U.S. Cl. 260—306.8 D                26 Claims

ABSTRACT OF THE DISCLOSURE

Certain novel 1,3,4-thiadiazolon-(5)-yl-(2)-urea compounds of the formula

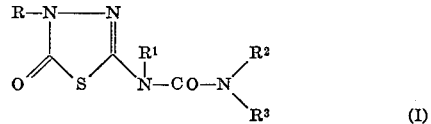

(I)

in which

R is substituted alkyl of from 1 to 5 carbon atoms wherein the substituent is at least one of the following radicals: aryloxy, alkylmercapto, arylmercapto, alkylsulfinyl, arylsulfinyl, alkylsulfonyl, arylsulfonyl, dialkylamino, alkoxycarbonyl, acyl, aminocarbonyl, N-mono- or N,N-di-substituted aminocarbonyl, nitro or cyano;
R can also be alkenyl of from 2 to 5 carbon atoms; or alkynyl of from 2 to 5 carbon atoms;
$R^1$ and $R^2$ are hydrogen or alkyl of from 1 to 3 carbon atoms; and
$R^3$ is alkyl or alkoxy of from 1 to 4 carbon atoms;

are prepared by reacting an unsubstituted urea of the formula

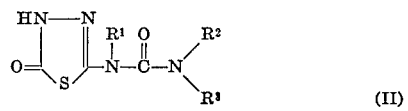

(II)

in which $R^1$, $R^2$ and $R^3$ have the meanings stated above in the presence of an acid-binding agent or in the form of a salt, with a compound of the formula

R—X                (III)

in which

R has the meaning stated above, and
X stands for halogen or the acid radical of the corresponding sulfuric acid ester or sulfonic acid ester.

The compounds produced possess marked herbicidal, particularly selective herbicidal, potency.

---

The present invention relates to certain new 4-substituted 1,3,4-thiadiazolon-(5)-yl-(2)-urea compounds, to herbicidal compositions containing them and to their use as herbicides. In addition, the instant invention relates to a novel process for making such compounds.

It has been proposed to prepare 4-substituted 1,3,4-thiadiazolon-(5)-yl-(2)-ureas similar to that of general formula (I) given below but in which the substituent R in the 4-position is saturated alkyl group, optionally substituted with alkoxy or aryl, or is cycloalkyl or aryl either by a process comprising (a) reacting with isocyanates the 2-amino-1,3,4-thiadiazolones-(5) obtainable from 1,4-disubstituted thiosemicarbazides and phosgene, or (b) reacting with primary or secondary amines the 2-(N-alkyl-N-chlorocarbonylamino)-1,3,4-thiadiazolones-(5) likewise obtainable from 1,4-disubstituted thiosemicarbazides and phosgene (cf. Liebigs Ann. Chem. 735, 158–188 (1970) and Beligan Patent Specification 731,751).

Because only a few of the 1,4-disubstituted thiosemicarbazide structures required for these processes are available or preparable it has hitherto been possible to prepare only those 4-substituted 1,3,4-thiadiazolon-(5)-yl-(2)-ureas in which the substituent in the 4-position (R) is restricted to the above-mentioned radicals, by these conventional syntheses.

The present invention provides novel 4-substituted 1,3,4-thiadiazolon-(5)-yl-(2)-ureas of the general formula

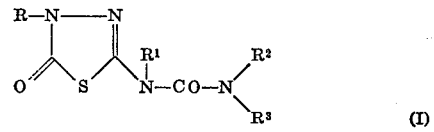

(I)

in which

R is substituted alkyl of from 1 to 5 carbon atoms wherein the substituent is at least one of the following radicals: aryloxy, alkylmercapto, arylmercapto (which may itself be substituted with e.g., halogen, alkyl, alkoxy, or nitro) alkylsulfinyl, arylsulfinyl, alkylsulfonyl, arylsulfonyl, dialkylamino, alkoxycarbonyl, acyl (i.e., alkanoyl), aminocarbonyl, N- mono- or N,N-di-substituted aminocarbonyl, nitro or cyano;
R can also be alkenyl of from 2 to 5 carbon atoms; or alkynyl of from 2 to 5 carbon atoms;
$R^1$ and $R^2$ (which may be the same or different) are hydrogen or alkyl of from 1 to 3 carbon atoms; and
$R^3$ is alkyl or alkoxy of from 1 to 4 carbon atoms.

Preferred are these compounds in which R is substituted alkyl of from 1 to 4 carbon atoms in which the substituted is at least one of the following radicals: phenoxy, halogenated phenoxy, alkylmercapto of from 1 to 3 carbon atoms, phenylmercapto, halophenylmercapto, alkylsulfinyl of from 1 to 4 carbon atoms, phenylsulfinyl, alkylsulfonyl of from 1 to 4 carbon atoms, phenylsulfonyl, dialkylamino with a total of 2 to 10 carbon atoms, alkoxycarbonyl of from 2 to 10 carbon atoms, acyl with 1 to 10 carbon atoms, aminocarbonyl or N-monsubstituted aminocarbonyl of from 2 to 10 carbon atoms, N,N-disubstituted aminocarbonyl with a total of 3 to 12 carbon atoms, nitro or cyano; for alkenyl with 2 to 4 carbon atoms; or for alkynyl with 2 to 4 carbon atoms.

As is already known, 1,3-thiazolyl-(2)-ureas, for example 1 - (5' - methyl-1',3'-thiazolyl-(2'))-3-methyl-urea, can be used as herbicidal active compounds. However, the newly accessible urea derivatives of this invention surprisingly show considerably stronger or more selective herbicidal properties than the ureas known from the prior art. The new substances obtainable according to the invention, like the preparative process, therefore represent an enrichment of the art.

The invention also provides a process for the production of a compound of formula (I) in which a 1,3,4-thiadiazolon-(5)-yl-(2)-urea which is unsubstituted in 4-position and is of the general formula

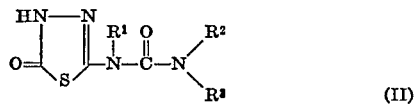 (II)

in which

R¹, R² and R³ have the meanings stated above in the presence of an acid-binding agent or in the form of a salt, is reacted with a compound of the general formula

R—X  (III)

in which

R has the meaning stated above, and

X stands for halogen or the acid radical of the corresponding sulfuric acid ester or sulphonic acid ester, optionally in the presence of a diluent.

By this process it is possible to prepare the compounds of the invention homogeneously and with good yields.

It is very surprising that the 1,3,4-thiadiazolon-(5)-(2)-ureas of the formula (II) unsubstituted in 4-position yield unambiguously and in smooth reaction the compounds of the formula (I), since by reason of good solubility in aqueous bases the tautomeric form (IIa) would seem to be the more probable and therefore, in the case of the action of compounds of the formula (III), at least partially the formation of 5-alkoxy- or -alkenyloxy- or -alkinyloxy-1,3,4-thiadiazole derivatives of the formula (IV) would have been expected:

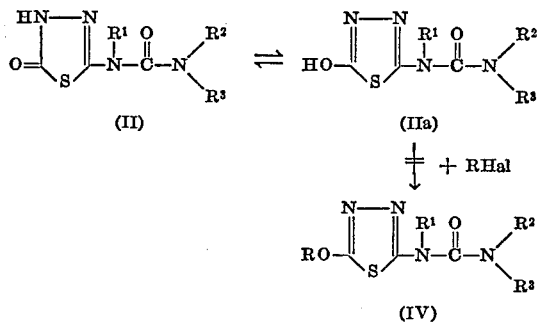

Compared with the previously known processes, the process according to the invention possesses in particular the advantage that many new, hitherto unaccessible urea derivatives of the formula (I) which exhibit herbicidal properties can be prepared in simple manner.

If 1,3-dimethyl-1-(1,3,4-thiadiazolon - (5) - yl-(2)-urea and allyl bromide are used as starting materials, the reaction course can be represented by the following formula scheme:

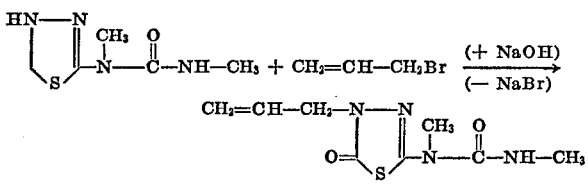

The 1,3,4-thiadiazolon-(5)-yl-(2)-ureas to be used as starting materials are unambiguously defined by the formula (II).

As examples of the urea derivatives of the formula (II) which can be used according to the invention, there are mentioned in particular:

3-methyl-1-(1,3,4-thiadiazolon-(5)-yl-(2))-urea
1,3-dimethyl-1-(1,3,4-thiadiazolon-(5)-yl-(2))-urea
1-ethyl-3-methyl-1-(1,3,4-thiadiazolon-(5)-yl-(2))-urea
1-propyl-3-methyl-1-(1,3,4-thiadiazolon-(5)-yl-(2))-urea
1-isopropyl-3-methyl-1-(1,3,4-thiadiazolon-(5)-yl-(2))-urea
1-methyl-3-ethyl-1-(1,3,4-thiadiazolon-(5)-yl-(2))-urea
1-methyl-3-allyl-1-(1,3,4-thiadiazolon-(5)-yl-(2))-urea
1,3,3-trimethyl-1-(1,3,4-thiadiazolon-(5)-yl-(2))-urea
1-ethyl-3,3-dimethyl-1-(1,3,4-thiadiazolon-(5)-yl-(2))-urea
1,3-dimethyl-3-butyl-1-(1,3,4-thiadiazolon-(5)-yl-(2))-urea
1,3-dimethyl-3-methoxy-1-(1,3,4-thiadiazolon-(5)-yl-(2))-urea The urea derivatives of the formula (II) used as starting materials have not yet become known but can be prepared in an unexpected reaction sequence by causing phosgene to act on 1-alkanoyl-4-alkylthiosemicarbazides of the formula (V) and reacting the resultant reaction products of the formula (VI) with amines of the formula (VII):

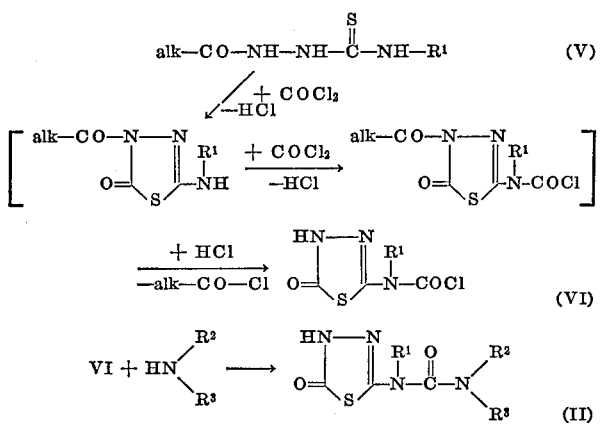

In these formulas, Alk stands for alkyl, while R¹, R² and R³ have the meanings stated above.

The reaction by which the compound (V) yields the compound (VI) is carried out in organic solvents which are inert to phosgene, for example in aliphatic or aromatic hydrocarbons, such as ligroin, benzene or toluene; or in chlorinated hydrocarbons, such as chloroform, carbon tetrachloride, trichloroethylene or chlorobenzene. Additions of other auxiliary materials are not required. The reaction is so conducted that, until heat ceases to be evolved, phosgene is introduced, with cooling, preferably at 10° to 30° C., and then, with gradually rising temperature until boiling of the solvent and occurrence of a clear solution, phosgene is further added or passed in. After removal of the solvent, the crude product of the formula (VI), which is obtained in most case as a viscous oil, is further reacted, as a rule without purification.

The reaction by which the compound (VI) yields the compound (II) may be carried out with a twice-molar amount of the primary or secondary amine concerned, or with a molar amount if, in order to bind the hydrogen chloride liberated, there is used the equimolar amount of another acid-binder, for example an alkali metal carbonate or alkaline earth metal carbonate or a tertiary amine. These reactions are carried out as a rule in organic solvents, for example in hydrocarbons, such as ligroin, benzene or toluene; in chlorinated hydrocarbons, such as chloroform, carbon tetrachloride or chlorobenzene; in ethers, such as diethyl ether, tetrahydrofuran or dioxan; in ketones, such as acetone or methylethyl ketone; or in other solvents inert to acid chlorides. They can, however, also be carried out in water or in the presence of water and an organic solvent when the acid chloride is added to the amine.

To isolate the compounds of the formula (II), it is advisable to render acidic the reaction mixtures after completion of reaction, since the compounds of the formula (II) form salts which are readily soluble in water. Because of this property, a purification from any by-products which may form can, if necessary, be readily effected by dissolving the crude products of the formula (II) in dilute aqueous alkalis and, after filtration, separating them again by acidification (cf. Preparative Examples).

The compounds R—X used as starting materials are defined generally by the formula (III).

X in formula (III) stands preferably for chlorine, bromine, iodine or the acid radical of the corresponding sulphuric acid ester or sulphonic acid ester. As examples of compounds of the formula (III), there are mentioned in particular:

allyl bromide
sulphuric acid diallyl ester
p-toluene sulphonic acid allyl ester
methallyl chloride
crotyl bromide
propargyl chloride
3-phenylallyl chloride
butyn-(3)-yl-(2)-chloride
2-methyl-butyn-(3)-yl-(2)-chloride
methylmercapto-methyl chloride
butylmercapto-methyl chloride
phenylmercapto-methyl chloride
4-chloro-phenylmercapto-methyl chloride
2-ethylmercapto-ethyl chloride
2-dimethylamino-ethyl chloride
3-morpholino-propyl chloride
chloroacetic acid ethyl ester
α-chloro-propionic acid methyl ester
α-chloro-isobutyric acid ethyl ester
chloroacetic acid dimethylamide
chloroacetic acid anilide
chloroacetonitrile
α-chloro-propionitrile
chloroacetone
chloromethyl tert.-butyl ketone
α-chloro-acetophenone The compounds of the formula (III) which can be used according to the invention are generally known or can readily be prepared in generally known manner from known starting materials.

The process according to the invention, the reaction of the 1,3,4-thiadiazolon-(5)-yl-(2)-ureas unsubstituted in 4-position of the formula (II) with compounds of the formula (III), is preferably carried out in the presence of a diluent. As diluent, inert organic solvents and water, as well as mixtures of water and organic solvents, are suitable. Suitable organic solvents include both those which are miscible with water and those which are not miscible with water, for example alcohols, such as methanol, ethanol, isopropyl alcohol, n-butanol; ketones, such as acetone, methylethyl ketone; ethers, such as diethyl ether, di-n-butyl ether, anisole, dioxan; esters, such as ethyl acetate; hydrocarbons, such as ligroin, benzene, toluene, xylene; chlorinated hydrocarbons, such as chloroform, carbon tetrachloride, chlorobenzene, methylene chloride, trichloroethylene; carboxylic acid amides, such as dimethyl formamide; and sulphoxides, such as dimethyl sulphoxide.

The reaction according to the invention may be carried out in the presence of an acid-binding agent. Suitable for this purpose are all customary acid-binders, for example alkali metal hydroxides, such as sodium and potassium hydroxides; alkaline earth metal hydroxides, such as calcium and barium hydroxides; alkali metal carbonates, such as sodium and potassium carbonates; alkaline earth metal carbonates, such as calcium carbonate; alkali metal alcoholates, such as sodium methylate and ethylate; ammonia and, especially, tertiary amines, such as trimethyl and triethyl amine; heavy metal bases, such as lead(II) hydroxide, lead(II) carbonate, (most) silver oxide or copper hydroxide, may also be used, heavy metal salts of the compounds of the formula (II) being formed.

The reaction temperatures can be varied within a fairly wide range. In general, the reaction is carried out at from 0° C. to the boiling point of the reaction mixture, preferably from 10° to 70° C.

In general, the reaction is carried out at normal pressure. The reaction can, however, be carried out in a closed vessel under pressure and otherwise the same conditions, for example if relatively volatile compounds of the formula (III) are used.

When carrying out the process according to the invention, for 1 mole of urea derivative of the formula (II) there are normally used at least 1 mole-equivalent of a compound of the formula (III) and at least 1 mole-equivalent of an acid-binding agent. An excess of a compound of the formula (II) and of acid-binding agent does not influence significantly the yield of products of the formula (I) and also does not lead to the formation of undesired by-products. In general, the acid-binding agent in the form of its concentrated aqueous solution is added to a suspension of the urea derivative (II), and the reactant (III) is subsequently added at room temperature; with stirring, heating to about 50° C. is then effected for 3 to 10 hours, depending on the reactivity of the compound (III); evaporation in a vacuum is then effected, followed by addition of water and a small amount of solution of sodium hydroxide to the residue and suction filtration of the crude products of the formula (I). The substances so obtained can, for purification, be recrystallised from suitable solvents, such as toluene, carbon tetrachloride, ethanol, or n-butanol.

According to a special embodiment of the process according to the invention, it is possible to prepare first a salt of the urea derivatives (II) and this, likewise preferably in the prescence of a diluent, is then reacted with a compound of the formula (II). As salts for this purpose, not only the alkali metal salts and alkaline earth metal salts are suitable, but also heavy metal salts, for example those of silver; lead or copper.

EXAMPLE 1

*Preparation of 1,3-dimethyl-1-(4-allyl-1,3,4-thiadiazolon-(5)-yl-(2))-urea*

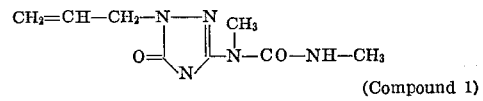

(Compound 1)

18.8 g. (0.1 mole) 1,3-dimethyl-1-(1,3,4-thiadiazolon-(5)-yl-(2))-urea (cf. Example (a) below) were suspended in 150 ml. methanol and, at room temperature, 4.0 g. (0.1 mole) sodium hydroxide (in the form of a concentrated aqueous solution) and 12.1 g. (0.1 mole) allyl bromide were added. The reaction mixture was stirred for 4 hours at +50° C.; the solvent was then distilled off in a vacuum, the residue was treated with a small amount of solution of sodium hydroxide (until there was a distinctly alkaline reaction) and the remaining residue was filtered off with suction. Yield: 17.6 g. (=77% of the theory) of 1,3-dimethyl-1-(4-allyl-1,3,4-thiadiazolon-(5)-yl-(2))-urea of the melting point 147° C. after recrystallization from toluene.

In analogous manner, the compounds of the general formula (I) which are identified in the following Table 1 can be prepared:

dried. Yield: 130 g. (69% of the theory) of 1,3-dimethyl-1-(1,3,4-thiadiazolon-(5)-yl(2))-urea. m.p.: 254.5° C. (from dimethyl formamide/methanol).

TABLE 1

| Compound number | R | $R^1$ | $R^2$ | $R^3$ | Compound name | M.P. (° C.) |
|---|---|---|---|---|---|---|
| 2 | CH₂=CH—CH₂ | CH₃ | CH₃ | CH₃ | 1,3,3-trimethyl-1-(4-allyl-1,3,4-thiadiazolon-(5)-yl-(2))-urea. | 42–43 |
| 3 | CH₂=CH—CH₂ | C₂H₅ | H | CH₃ | 1-ethyl-3-methyl-1-(4-allyl-1,3,4-thiadiazolon-(5)-yl-(2))-urea. | 130 |
| 4 | CH₂=CH—CH₂ | C₂H₅ | CH₃ | CH₃ | 1-ethyl-3,3-dimethyl-1-(4-allyl 1,3,4 thiadiazolon (5)-yl-(2))-urea. | (¹) |
| 5 | CH₃—CH=CH—CH₂ | CH₃ | H | CH₃ | 1,3-dimethyl-1-(4-but-2-enyl-1,3,4-thiadiazolon-(5)-yl-(2))-urea. | 149–150 |
| 6 | CH₃—CH=CH—CH₂ | CH₃ | CH₃ | CH₃ | 1,3,3-trimethyl-1-(4-buten-2-yl-1,3,4-thiadiazolon-(5)-yl-(2))-urea. | 45 |
| 7 | H≡C—CH₂ | CH₃ | H | CH₃ | 1,3-dimethyl-1-(4-propargyl-1,3,4-thiadiazolon-(5)-yl-(2))-urea. | 196 |
| 8 | HC≡C—CH₂ | CH₃ | CH₃ | CH₃ | 1,3,3-trimethyl-1-(4-propargyl-1,3,4-thiadiazolon-(5)-yl-(2))-urea. | 89–90 |
| 9 | HC≡C—CH₂ | C₂H₅ | H | CH₃ | 1-ethyl-3-methyl-1-(4-propargyl-1,3,4-thiadiazolon-(5)-yl-(2))-urea. | 157 |
| 10 | Cl—C₆H₃(Cl)—O—CH₂ | CH₃ | H | CH₃ | 1,3-dimethyl-1-(4-(2,4-dichlorophenoxymethyl)-1,3-4-thiadiazolon-(5)-yl-(2))-urea. | 177–176 |
| 11 | Cl—C₆H₄—S—CH₂ | CH₃ | H | CH₃ | 1,3-dimethyl-1-4-(4-chlorophenylthiomethyl)-1,3,4-thiadiazolon-(5)-yl-(2) urea. | 197–198 |
| 12 | Cl—C₆H₄—SCH₂ | CH₃ | CH₃ | CH₃ | 1,3,3-trimethyl-1-(4-(4-chlorophenylthiomethyl)-1,3,4-thiadiazolon-(5)-yl-(2) urea. | 106 |
| 13 | C₂H₅—S—CH₂—CH₂ | CH₃ | H | CH₃ | 1,3-dimethyl-1-(4-ethylthioethyl)-1,3,4-thiadiazolon-(5)-yl-(2) urea. | 112–113 |
| 14 | C₂H₅—S—CH₂—CH₂ | CH₃ | CH₃ | CH₃ | 1,3,3-trimethyl-1-(4-(ethylthioethyl)-1,3,4-thiadiazolon-(5)-yl-(2)) urea. | 65–66 |
| 15 | C₂H₅—S—CH₂—CH₂ | C₂H₅ | H | CH₃ | 1-ethyl-3-methyl-1-(4-ethylthioethyl)-1,3,4-thiadiazolon-(5)-yl-(2)) urea. | 121–122 |
| 16 | (CH₃)₂N—CH₂—CH₂ | CH₃ | H | CH₃ | 1,3-dimethyl-1-(4-(2-dimethylaminoethyl)-1,3,4-thiadiazolon-(5)-yl-(2))-urea. | 122 |
| 17 | CH₃—CO—CH₂ | CH₃ | H | CH₃ | 1,3-dimethyl-1-(4-methylcarbonylmethyl-1,3,4-thiadiazolon.(5)-yl-(2))-urea. | 191 |
| 18 | CH₃—CO—CH₂ | CH₃ | CH₃ | CH₃ | 1,3,3-trimethyl-1-(4-methylcarbonylmethyl-1,3,4-thiadiazolon-(5)-yl-(2))-urea. | 139 |
| 19 | C₂H₅O—CO—CH₂ | CH₃ | H | CH₃ | 1,3-dimethyl-1-(4-ethoxycarbonylmethyl-1,3,4-thiadiazolon-(5)-yl-(2))-urea. | 157 |

¹ Oil; $n_D^{20}$: 1.5410.

The following Examples more particularly illustrate the preparation of the starting materials.

Example (a)

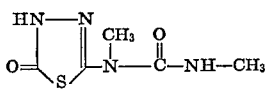

Into a suspension of 161 g. (1 mole) 1-propionyl-4-methylthiosemicarbazide (m.p. 146–147° C.) in 1 liter of chlorobenzene there were introduced at 15–20° C., with cooling, first 99 g. (1 mole) phosgene and then, while phosgene continued to be introduced, the temperature was increased to about 120° C. At this temperature, phosgenation was continued until a clear solution had formed (total consumption of phosgene, about 230 g. (2.3 moles)). After the solvent and other volatile components had been distilled off, about 225 g. of a viscous oil remained behind. This oil was dissolved in 750 ml. acetone and added dropwise at 10–20° C., with cooling, to a mixture of 200 g. (2.25 moles) of 35%-strength aqueous methylamine and 600 ml. acetone. Stirring was afterwards effected for one hour at room temperature, the solvent was to a large extent distilled off in a vacuum; to the residue there were added 3 liters of water, and hydrochloric acid was added until a pH value of 2–3 was reached. The insoluble matter was filtered off with suction and, for further purification, suspended in 2 liters of an approximately 3%-strength of sodium hydroxide. The insoluble matter was filtered off with suction, washed with water and discarded. After the acidification and cooling of the filtrate there was obtained the purified product, which was filtered off with suction, washed with water and Example (b)

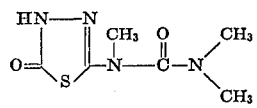

In corresponding manner, 1,3,3-trimethyl-1-(1,3,4-thiadiazolon-(5)-yl-(2))-urea can be prepared; m.p. 168–169° C. (from n-butanol).

Example (c)

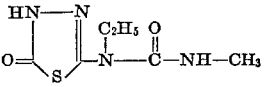

In corresponding manner, 3-methyl-1-ethyl-1-(1,3,4-thiadiazolon-(5)-yl(2))-urea can also be prepared; m.p.: 176–178° C.

The new thiadiazolonylureas according to the invention exhibit a strong herbicidal potency and can therefore be used as weed killers. By weeds in the widest sense are meant all plants which grow in places where they are not desired. Whether the active compounds according to the invention act as total or selective herbicidal agents depends on the magnitude of the amount of active compound applied and on the time of application.

The new active compounds according to the invention can be used for example in the case of the following plants: dicotyledons, such as mustard (Sinapis), cress (Lepidium), cleavers (Galium), chickweed (Stellaria), chamomile (Matricaria), gallant soldier (Galinsoga), goosefoot (Chenopodium), annual nettle (Urtica), groundsel (Senecio), cotton (Gossypium), beets (Beta), carrots (Daucus), beans (Phaseolus), potatos (Solanum), coffee (Coffea); monocotyledons, such as timothy (Phleum), blue grass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum).

The thiadiazolonylureas are preferably used as selective herbicides. They exhibit a good selectivity when applied according to the pre-emergence method in the cultivation of cereals, cotton and other crops. In the case of postemergence application, the new thiadiazolonylureas likewise show a superior herbicidal activity and can, depending on the amount applied, be used not only as selective herbicides but also as total herbicides.

The active compounds according to the present invention can be converted into the usual formulation, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids which would be gaseous at normal temperatures and pressures, e.g. aerosol propellants, such as halogenated hydrocarbons, e.g. freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, alkyl sulphonates, alkyl sulphates and aryl sulphonates; and preferred examples of dispersing agents include lignin, sulphite waste liquors and methyl cellulose.

The active compounds according to the invention may be converted into the customary formulations, such as solutions, emulsions, suspensions, powders, pastes and granulates. These are prepared in known manner, e.g. by mixture of the active compounds with extenders, i.e. liquid solvents and/or solid carrier substances, possibly with the use of surface-active agents, i.e. emulsifiers and/or dispersing agents. In the case of the use of water as extender, for example organic solvents may also be used as auxiliary solvents. As liquid solvents, in the main the following are suitable: aromatics, such as xylene and benzene, chlorinated aromatics, such as chlorobenzenes, paraffins, such as petroleum fractions, alcohols, such as methanol and butanol, strongly polar solvents, such as dimethyl formamide and dimethyl sulphoxide, and water; as solid carrier substances: natural mineral powders, such as kaolins, aluminas, talcum and chalk, and synthetic mineral powders, such as highly dispersed silicic acid and silicates; as emulsifiers: non-ionic and anionic emulsifiers, such as polyoxyethylene fatty acid esters, polyoxyethylene fatty alcohol ethers, e.g. alkylaryl polyglycol ethers, alkylsulphonates and arylsulphonates; as dispersing agents: e.g. lignin, sulphite waste liquors and methyl cellulose.

The active compounds according to the invention may be present in the formulations in admixture with other active compounds.

The formulations contain, in general, between 0.1 and 95, preferably between 0.5 and 90, percent by weight of active compound.

The active compounds may be applied as such or in the form of their formulations or of the application forms prepared therefrom, such as ready-to-use solutions, emulsions, suspensions, powders, pastes and granulates. Application takes place in the usual manner, for example by dusting, spraying, squirting, watering and scattering.

The amount applied may vary within fairly wide ranges. It depends essentially on the nature of the desired effect. In general, the applied amounts are from 0.1 to 20 kg. of active compound per hectare, preferably 0.3 to 15 kg. per hectare.

The invention also provides a herbicidal composition containing as active ingredient a compound according to the invention in admixture with a solid or liquefied gaseous diluent or carrier or in admixture with a liquid diluent or carrier containing a surface-active agent.

The invention also provides a method of combating weeds which comprises applying to the weeds or a weed habitat a compound according to the invention alone or in the form of a composition containing as active ingredient a compound according to the invention in admixture with a diluent or carrier.

The invention is illustrated by the following Examples. In Examples A and B the active compounds according to the invention are identified by numbers corresponding to those in Table 1 following Example 1. The active compound identified as "B" is the known compound of the formula:

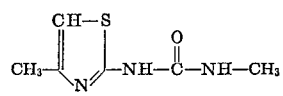

EXAMPLE A

Post-emergence test

Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Test plants which had a height of 5–15 cm. were sprayed with the preparation of the active compound so that the amounts of active compound per unit area which were stated in the Table were applied. Depending on the concentration of the spray liquor, the amount of water applied lies between 1000 and 2000 liters/hectare. After three weeks, the degree of damage to the plants was determined and characterized by the values 0–5, which have the following meaning:

0. no effect
1. a few slightly burnt spots
2. marked damage to leaves
3. some leaves and parts of stalks partially dead
4. plant partially destroyed
5. plant completely dead.

The active compounds, the amounts applied and the results can be seen from the following Table.

TABLE —POST-EMERGENCE TEST

| Active compound | Active compound applied, kg./hectare | Echino-chola | Cheno-podium | Sina-pis | Galin-soga | Stella-ria | Urtica | Matri-caria | Oats | Cotton | Wheat | Carrots |
|---|---|---|---|---|---|---|---|---|---|---|---|---|
| "B" (known) | 2 | 4 | 5 | 5 | 5 | 4-5 | 3 | 3 | 1-2 | 2-3 | 1-2 | 3 |
|  | 1 | 3 | 4-5 | 4-5 | 4-5 | 3 | 1 | 3 | 1 | 2 | 1 | 1 |
|  | 0.5 | 1 | 3 | 4 | 3 | 2 | 0 | 2 | 0 | 0 | 0 | 0 |
| (Compound 1) | 2 | 5 | 5 | 5 | 5 | 5 | 5 | 5 | 5 | 5 | 3 | 5 |
|  | 1 | 5 | 5 | 5 | 5 | 5 | 5 | 4-5 | 4-5 | 4 | 1 | 5 |
|  | 0.5 | 4 | 5 | 4 | 5 | 5 | 5 | 4 | 4 | 3 | 0 | 5 |
| (Compound 7) | 2 | 5 | 5 | 5 | 5 | 5 | 5 | 5 | 5 | 5 | 3 | 5 |
|  | 1 | 5 | 5 | 5 | 5 | 5 | 5 | 4 | 4-5 | 3 | 1 | 5 |
|  | 0.5 | 4 | 5 | 5 | 5 | 5 | 5 | 3 | 3 | 2 | 0 | 3 |
| (Compound 5) | 2 | 5 | 4-5 | 5 | 5 | 5 | 5 | 5 | 4-5 | 4-5 | 3-4 | 5 |
|  | 1 | 5 | 4-5 | 5 | 5 | 5 | 5 | 4 | 4-5 | 4 | 2 | 5 |
|  | 0.5 | 5 | 4-5 | 4 | 5 | 5 | 5 | 3 | 3 | 4 | 2 | 4-5 |
| (Compound 3) | 2 | 5 | 5 | 5 | 5 | 5 | 5 | 5 | 5 | 4 | 4 | 5 |
|  | 1 | 5 | 5 | 5 | 5 | 5 | 5 | 5 | 4-5 | 3 | 3 | 5 |
|  | 0.5 | 4-5 | 4-5 | 5 | 5 | 4-5 | 5 | 3 | 4 | 2 | 2 | 3 |
| (Compound 9) | 2 | 5 | 5 | 5 | 5 | 5 | 5 | 4 | 4-5 | 3 | 2 | 5 |
|  | 1 | 5 | 5 | 5 | 5 | 5 | 5 | 3 | 4-5 | 2 | 2 | 4 |
|  | 0.5 | 4 | 4-5 | 5 | 5 | 4 | 4-5 | 3 | 3 | 2 | 1 | 3 |

EXAMPLE B

Pre-emergence test

Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compound. It was expedient to keep constant the amount of water per unit area. The concentration of the active compound in the preparation was of no importance, only the amount of active compound applied per unit area being decisive. After three weeks, the degree of damage to the test plants was determined and characterized by the values 0–5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The active compounds, the amounts applied and the results obtained can be seen from the following Table:

TABLE.—PRE-EMERGENCE TEST

| Active compound | Active compound applied, kg./hectare | Echino-chloa | Cheno-podium | Sina-pis | Oats | Cotton | Wheat |
|---|---|---|---|---|---|---|---|
| "B" (known) | 10 | 4 | 5 | 4 | 3-4 | 3 | 4 |
|  | 5 | 3 | 4 | 3 | 3 | 1 | 3 |
|  | 2.5 | 2 | 2-3 | 1 | 2 | 0 | 1 |
| (Compound 1) | 10 | 5 | 5 | 5 | 0 | 3 | 4 |
|  | 5 | 5 | 5 | 5 | 0 | 1 | 3 |
|  | 2.5 | 4 | 4 | 5 | 0 | 0 | 3 |
| (Compound 7) | 10 | 5 | 5 | 5 | 4 | 0 | 0 |
|  | 5 | 4 | 5 | 5 | 3 | 0 | 0 |
|  | 2.5 | 3 | 4 | 4 | 2 | 0 | 0 |
| (Compound 5) | 10 | 5 | 5 | 5 | 3 | 3 | 1 |
|  | 5 | 4 | 5 | 5 | 3 | 1 | 0 |
|  | 2.5 | 3 | 5 | 5 | 2 | 0 | 0 |

It will be understood that the specification and examples are illustrative but not limitative of the present invention and that other embodiments within the spirit and scope of the invention will suggest themselves to those skilled in the art.

What is claimed is:

1. 4-substituted 1,3,4 - thiadiazolon - (5) - yl-(2)-urea compound of the formula

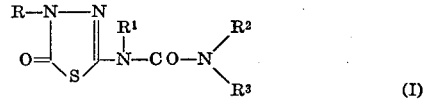

(I)

in which
R is substituted alkyl wherein the alkyl moiety has from 1 to 5 carbon atoms and the substituent is at least one member of the group consisting of aryloxy, arylmercapto, alkylmercapto, alkylsulfinyl, arylsulfinyl, alkylsulfonyl, arylsulfonyl, dialkylamino, alkoxycarbonyl, alkanoyl, aminocarbonyl, N-mono- or N,N-di-substituted aminocarbonyl, nitro or cyano, and wherein said aryloxy and arylmercapto may be additionally substituted with halogen, alkyl, alkoxy or nitro, and wherein the substituent contains not more than 12 carbon atoms; and R can also be alkenyl or alkynyl of from 1 to 5 carbon atoms; $R^1$ and $R^2$ (which may be the same or different) are hydrogen or alkyl of from 1 to 3 carbon atoms; and $R^3$ is alkyl or alkoxy of from 1 to 4 carbon atoms.

2. Compound as claimed in claim 1 wherein the substituent in R is phenoxy.

3. Compound as claimed in claim 1 wherein the substituent in R is alkylmercapto of from 1 to 3 carbon atoms.

4. Compound as claimed in claim 1 wherein the substituent in R is phenylmercapto.

5. Compound as claimed in claim 1 wherein the substituent in R is alkylsulfinyl.

6. Compound as claimed in claim 1 wherein the substituent in R is phenylsulfinyl.

7. Compound as claimed in claim 1 wherein the substituent in R is alkylsulfonyl of from 1 to 4 carbon atoms.

8. Compound as claimed in claim 1 wherein the substituent in R is phenylsulfonyl.

9. Compound as claimed in claim 1 wherein the substituent in R is dialkylamino of from 2 to 10 carbon atoms.

10. Compound as claimed in claim 1 wherein the substituent in R is alkoxycarbonyl of from 2 to 10 carbon atoms.

11. Compound as claimed in claim 1 wherein the substituent in R is alkanoyl of from 1 to 10 carbon atoms.

12. Compound as claimed in claim 1 wherein the substituent in R is aminocarbonyl.

13. Compound as claimed in claim 1 wherein the substituent in R is N- mono- or N,N-di-substituted aminocarbonyl of from 2 to 12 carbon atoms.

14. Compound as claimed in claim 1 wherein the substituent in R is nitro.

15. Compound as claimed in claim 1 wherein the substituent in R is cyano.

16. Compound as claimed in claim 1 wherein R is alkenyl or alkynyl of from 2 to 5 carbon atoms.

17. Compound as claimed in claim 1 wherein $R^1$ and $R^2$ are hydrogen.

18. Compound as claimed in claim 1 wherein $R^1$ and $R^2$ are alkyl of from 1 to 3 carbon atoms.

19. Compound as claimed in claim 1 wherein $R^3$ is alkyl of from 1 to 4 carbon atoms.

20. Compound as claimed in claim 1 wherein $R^3$ is alkoxy of from 1 to 4 carbon atoms.

21. Compound as claimed in claim 1 designated 1,3-dimethyl-1-(4-allyl-1,3,4-thiadiazolon -(5)-yl-(2)-urea.

22. Compound as claimed in claim 1 designated 1,3,3-trimethyl-1-(4-allyl-1,3,4-thiadiazolon-(5)-yl-(2) )-urea.

23. Compound as claimed in claim 1 designated 1-ethyl-3-methyl-1-(4-allyl-1,3,4-thiadiazolon-(5)-yl-(2) )-urea.

24. Compound as claimed in claim 1 designated 1-ethyl-3,3 - dimethyl - 1-(4-allyl-1,3,4-thiadiazolon-(5)-yl-(2) )-urea.

25. Compound as claimed in claim 1 designated 1,3-dimethyl-1-(4-but-2-enyl-1,3,4 - thiadiazolon-(5)-yl-(2) )-urea.

26. Compound as claimed in claim 1 designated 1,3,3-trimethyl-1-(4-but-2-enyl-1,3,4-thiadiazolon-(5)-yl-(2) )-urea.

References Cited

UNITED STATES PATENTS 3,657,264  4/1972  Rucker et al. _____ 260—306.8

FOREIGN PATENTS 1,816,568  11/1970  Germany _____ 260—306.8 D

OTHER REFERENCES

Katritzky et al. (eds.), *Advances in Heterocyclic Chemistry*, Academic Press, New York, 1968, p. 188, vol. 9.

Sasse, *Ann., 735*, 158–88, 1970.

RICHARD J. GALLAGHER, Primary Examiner

U.S. Cl. X.R.

71—90; 260—247.1

UNITED STATES PATENT OFFICE
CERTIFICATE OF CORRECTION

Patent No. 3,840,551                    Dated   October 8, 1974

Inventor(s) Klaus Sasse and Ludwig Eue

It is certified that error appears in the above-identified patent and that said Letters Patent are hereby corrected as shown below:

Column 3, line 57 after 1,3-dimethyl-1-(1,3,4-thiadiazolon-(5)-yl-(2)

insert another                    --)--.

Column 3, line 65 the first part of the formula should read

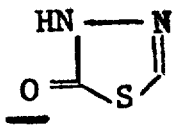

Column 6, line 55 the formula should read as follows:

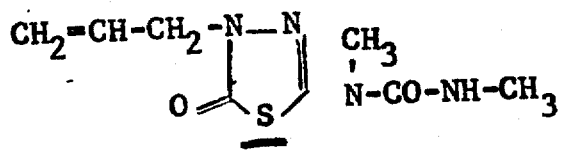

(Compound 1)

Column 7, in Table 1, Compound No. 7 under the R column, delete

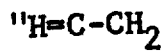 "H=C-CH$_2$ and insert therefor            --HC=C-CH$_2$--.

UNITED STATES PATENT OFFICE
CERTIFICATE OF CORRECTION

Patent No. 3,840,551          Dated October 8, 1974

Inventor(s) Klaus Sasse and Ludwig Eue          Page - 2

It is certified that error appears in the above-identified patent and that said Letters Patent are hereby corrected as shown below:

Column 7, in Table 1, Compound No. 10 under the M.P. (°C.) heading delete "177-176 and insert therefor --177-179

Signed and sealed this 7th day of January 1975.

(SEAL)
Attest:

McCOY M. GIBSON JR.
Attesting Officer

C. MARSHALL DANN
Commissioner of Patents